US009967723B2

(12) United States Patent
Sabeur et al.

(10) Patent No.: US 9,967,723 B2
(45) Date of Patent: May 8, 2018

(54) ROAMING LTE EMERGENCY CALL WITH CALL BACK NUMBER RETRIEVAL

(71) Applicant: T-Mobile, U.S.A, Inc., Bellevue, WA (US)

(72) Inventors: Nassereddine Sabeur, Renton, WA (US); Hichem Zait, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days. days.

(21) Appl. No.: 15/489,557

(22) Filed: Apr. 17, 2017

(65) Prior Publication Data
US 2017/0366954 A1    Dec. 21, 2017

Related U.S. Application Data

(60) Provisional application No. 62/351,237, filed on Jun. 16, 2016, provisional application No. 62/401,114, filed on Sep. 28, 2016.

(51) Int. Cl.
*H04M 11/04* (2006.01)
*H04W 4/22* (2009.01)
(Continued)

(52) U.S. Cl.
CPC ............... *H04W 4/22* (2013.01); *H04W 8/08* (2013.01); *H04W 76/007* (2013.01); *H04W 84/042* (2013.01)

(58) Field of Classification Search
CPC ........ H04W 4/22; H04W 8/08; H04W 84/042
(Continued)

(56) References Cited

U.S. PATENT DOCUMENTS

2007/0254625 A1    11/2007   Edge
2010/0009659 A1*   1/2010    Netanel ................... H04L 63/06
                                                                 455/411
(Continued)

OTHER PUBLICATIONS

3rd Generation Partnership Project; Technical Specification Group Services and System Aspects; "Internet Protocol (IP) based IP Multimedia Subsystem (IMS) Emergency Sessions (Release 7)," 3GPP TR 23.867 V7.1.0, Dec. 15, 2005. See section 4.6; figure 4.3.
(Continued)

*Primary Examiner* — Nghi H Ly
(74) *Attorney, Agent, or Firm* — Han Santos, PLLC

(57) ABSTRACT

A roaming wireless user device on a Visited Public Land Mobile Network (VPLMN) may initiate a Long-Term Evolution (LTE) emergency call to a Public Safety Answering Point (PSAP). Accordingly, a Proxy Call Session Control Function (P-CSCF) of the VPLMN may receive an anonymous Session Initiation Protocol (SIP) invite message for the LTE emergency call. The anonymous SIP invite message lacks a Mobile Station International Subscriber Directory Number (MSISDN) of the wireless user device but has an International Mobile Equipment Identity (IMEI) of the wireless user device. The anonymous SIP invite message is forwarded to a Location Retrieval Function (LRF) in a Gateway Mobile Location Center (GMLC) of the VPLMN. The LRF obtains a MSISDN of the wireless user device that matches the IMEI in the anonymous SIP invite message from a database of the GMLC, such that the MSISDN is routed with the LTE emergency call to the PSAP.

20 Claims, 4 Drawing Sheets

(51) Int. Cl.
*H04W 76/00* (2018.01)
*H04W 8/08* (2009.01)
*H04W 84/04* (2009.01)

(58) Field of Classification Search
USPC .................. 455/404.1, 410, 414.1, 466, 418
See application file for complete search history.

(56) References Cited

U.S. PATENT DOCUMENTS

| | | |
|---|---|---|
| 2010/0304705 A1 | 12/2010 | Hursey |
| 2011/0026440 A1 | 2/2011 | Dunn et al. |
| 2015/0016420 A1 | 1/2015 | Balabhadruni et al. |
| 2015/0140946 A1* | 5/2015 | Hursey .................. H04M 11/04 |
| | | 455/404.1 |
| 2015/0237487 A1* | 8/2015 | Titcombe ................ H04W 4/14 |
| | | 455/466 |

OTHER PUBLICATIONS

International Search Report and Written Opinion dated Oct. 26, 2017 for PCT Application No. PCT/US2017/035077, 10 pages.

\* cited by examiner

ROAMING LTE EMERGENCY CALL WITH CALL BACK NUMBER RETRIEVAL

CROSS REFERENCE TO RELATED PATENT APPLICATIONS

This patent claims priority to U.S. Provisional Patent Application No. 62/351,237, filed on Jun. 16, 2016, entitled "Roaming Emergency Call for S8HR Architecture," and U.S. Provisional Application No. 62/401,114, filed on Sep. 28, 2016, entitled "Roaming Emergency Call with IMSI Retrieval," which are hereby incorporated by reference in their entirety.

BACKGROUND

Enhanced 911 is a North American emergency response system that enables callers to reach emergency response resources, such as police, fire, and medical response personnel. The location of a caller that made an incoming phone call is automatically determined, and the incoming phone call is answered by a Public Safety Answering Point (PSAP) of a government agency that oversees emergency response in the jurisdiction of the caller. An emergency phone call made using a landline to a PSAP is identified by an associated telephone number of the caller. The telephone number enables the PSAP to use a database to obtain a registered physical address of the caller, and additionally enables PSAP personnel to call back the caller in case of call disconnection.

The U.S. Federal Communications Commission (FCC) also mandates that a wireless carrier network routes 911 emergency calls made using any wireless user device active on the network to a PSAP, regardless of whether the user of the wireless user device is a subscriber of the wireless carrier network. This means that a wireless carrier network is responsible for routing emergency calls made from non-subscriber user devices that are roaming on the wireless carrier network to the responsible PSAPs. However, in cases in which the emergency calls made from non-subscriber user devices are Long-Term Evolution (LTE) calls, a wireless carrier network may be unable to provide the PSAPs with the call back telephone numbers, i.e., Mobile Station International Subscriber Directory Numbers (MSISDNs), of the non-subscriber user devices. As a result, a PSAP may be unable to call back a caller that is using a roaming user device to place the LTE emergency call in case of unintentional disconnect.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques that are implemented by a Visited Public Land Mobile Network (VPLMN) for routing a roaming Long-Term Evolution (LTE) emergency phone call to a Public Safety Answering Point (PSAP) with an associated Mobile Station International Subscriber Directory Number (MSISDN) of a wireless user device that placed the call. The wireless user device may be roaming on the VPLMN, i.e., using the wireless telecommunication services provided by the VPLMN, because it is unable to establish communication with its own Home Public Land Mobile Network (HPLMN). In such a scenario, the user of the roaming wireless user device is a subscriber of the HPLMN but not a subscriber of the VPLMN, i.e., the user has an active subscriber account with the HPLMN but not the VPLMN.

In a conventional VPLMN, when a roaming wireless user device of a non-subscriber makes an emergency phone call over LTE, the call is routed by the VPLMN to a PSAP. However, because the roaming wireless user device belongs to a non-subscriber, the Emergency Call Session Control Function (E-CSCF) of the VPLMN is unable to obtain the MSISDN of the roaming wireless user device. Consequently, the VPLMN will route the LTE emergency phone call to the PSAP as an anonymous call. This means that the PSAP personnel will not have the ability to call back the non-subscriber.

The techniques described herein modify the handling by the VPLMN of a LTE emergency phone call initiated at the roaming wireless user device. The modifications involve the E-CSCF of the VPLMN sending a retrieval request that includes the International Mobile Equipment Identity (IMEI) of the roaming wireless user device to the Location Retrieval Function (LRF) in the Gateway Mobile Location Centre (GMLC) of the VPLMN. In some embodiments, the E-CSCF may send the retrieval request to the LRF in conjunction with a request to retrieve the Uniform Resource Identifier (URI) of the PSAP. In turn, the LRF may return to the E-CSCF a MSISDN that matches the IMEI of the roaming wireless user device. The MSISDN is then passed on by the E-CSCF to the PSAP during the routing the emergency phone call.

Accordingly, the techniques provide a PSAP with an ability to call back a user that is using a roaming wireless user device in the event that a LTE emergency phone call initiated at the device is prematurely terminated. Such an ability alleviates the concern that unintended disconnects of anonymous emergency phone calls may potentially jeopardize the life or safety of the caller, and provides an extra margin of safety for wireless device users who are roaming on VPLMNs. The techniques described herein may be implemented in a number of ways. Example implementations are provided below with reference to the following FIGS. 1-4.

Example Architecture

Figure 1:
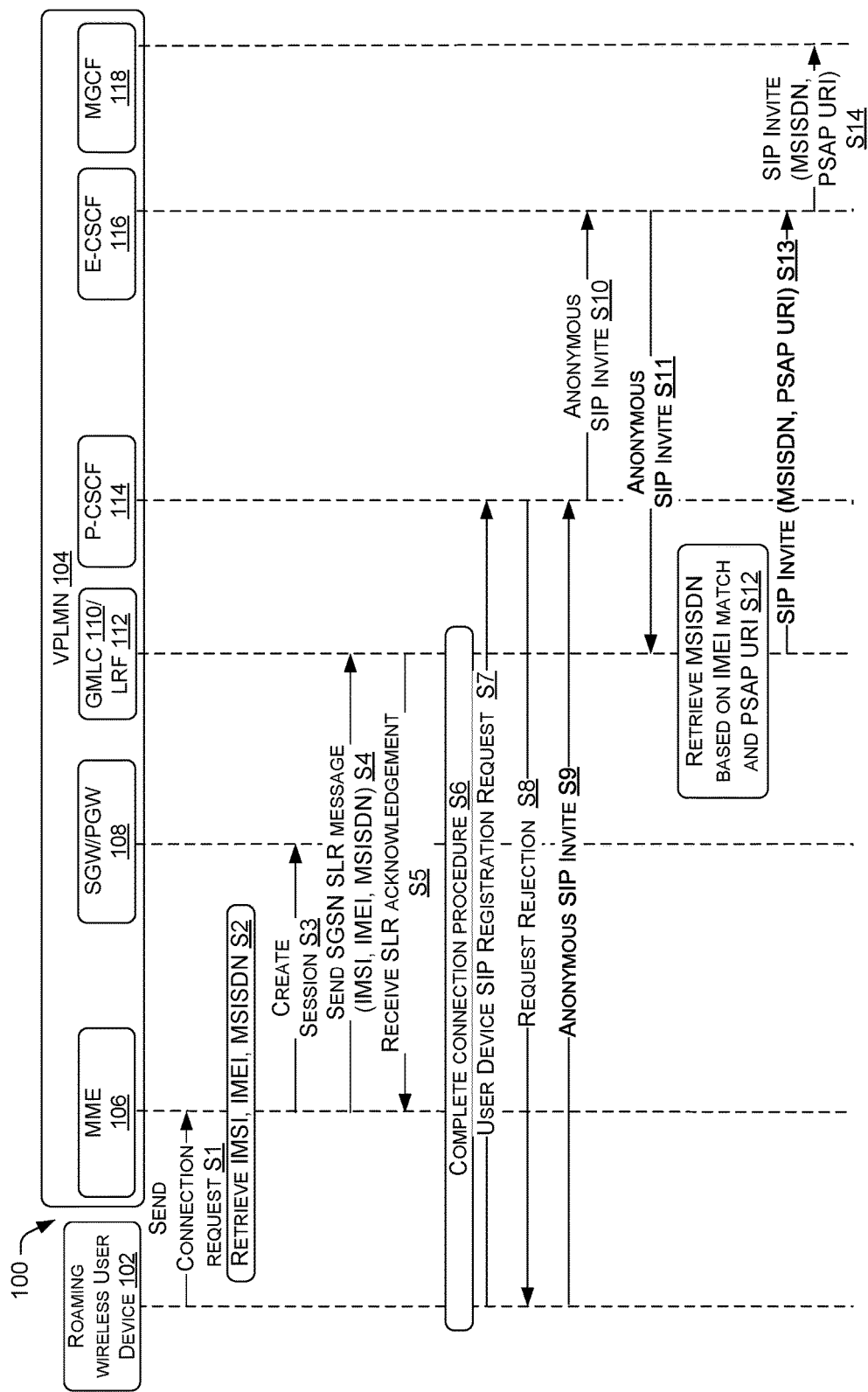
FIG. 1 is a block diagram showing an example call flow for routing a roaming Long-Term Evolution (LTE) emergency phone call to a Public Safety Answering Point (PSAP) with a Mobile Station International Subscriber Directory Number (MSISDN) of the wireless user device used to make the call.

FIG. 1 is a block diagram showing an example call flow for routing a roaming LTE emergency phone call to a PSAP with a MSISDN of the wireless user device used to make the call. The call flow may be implemented by components of a wireless carrier network. The wireless carrier network may provide telecommunication and data communication to multiple wireless user devices in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth.

The multiple wireless user devices that are serviced by the wireless carrier network may include user devices that belong to subscribers of the wireless carrier network, in which each subscriber of the wireless carrier network is a customer of the network that has established an active subscriber account with the wireless carrier network. Accordingly, the wireless carrier network may be referred to as a HPLMN for such subscribers. The multiple wireless user devices may further include user devices that belong to non-subscribers of the wireless carrier network. A non-subscriber of the wireless carrier network does not have an active subscriber account with the wireless carrier network. Instead, a wireless user device of the non-subscriber may be roaming on the wireless carrier network because the device is unable to obtain service from its HPLMN, i.e., a wireless carrier network for which the user is a subscriber. Accordingly, the wireless carrier network may be referred to as a VPLMN for such non-subscribers. Roaming enables the wireless user device of the non-subscribers to make and receive calls, send and receive data, and/or access network services from the VPLMN.

As shown in FIG. 1, a roaming wireless user device 102 may be using the services provided by a wireless carrier network that is referred to as a VPLMN 104. The VPLMN 104 may include base stations and a core network. The base stations are responsible for handling voice and data traffic between user devices and the core network. In some embodiments, the base stations may be in the form of eNodeB nodes. Each eNodeB node may include a base transceiver system (BTS) that communicates via an antennae system over an air-link with one or more user devices that are within range. The antenna system of an eNodeB node may include multiple antennae that are mounted on a radio tower to provide a coverage area that is referred to as a "cell." The BTS may send RF signals to user devices and receive radio signals from user devices.

The core network may connect the user devices to other telecommunication and data communication networks, such as the Internet and a public switched telephone network (PSTN). The components in the core network of the VPLMN 104 that carry out the call flow for routing a roaming LTE emergency phone call may include a Mobility Management Entity (MME) 106, a gateway 108, a GMLC 110 having a LRF 112, a Proxy Call Session Control Function (P-CSCF) 114, an E-CSCF 116, and a Media Gateway Control Function (MGCF) 118.

The MME 106 may handle paging, authentication, and registration of LTE-compatible wireless user devices, as well as the routing of data communications and VoLTE calls through a gateway 108. In various embodiments, the gateway may be a Serving Gateway (SGW) or a Packet Data Network Gateway (PGW). The SGW may route data packets from the base stations, coordinate base station handovers, and manager user-plane mobility. The PGW may provide traffic entry and exit points to external packet data networks, as well as perform packet filtering, charging support, and/or policy enforcement functions.

The GMLC 110 contains functions that supports location based services, such as the LRF 112. In various embodiments, the GMLC 110 may store the IMSIs, IMEIs, and the MSISDNs of wireless user devices that initiate phone calls on the wireless carrier network (referred to as VPLMN 104) in a device identifier database. The LRF 112 handles the retrieval of geolocation information for a wireless user device that initiated an emergency phone call. The LRF 112 may obtain the geolocation through interaction with IP Connectivity Access Network (IP-CAN) components of the core network that retrievals the geolocation from the wireless user device and/or computes the geolocation using signal triangulation techniques. The LRF 112 may pass the geolocation information to the E-CSCF 116 for routing to the PSAP.

In various embodiments, the LRF 112 may be further configured to perform a MSISDN retrieval operation. For such an operation, the LRF 112 may receive an anonymous Session Initiation Protocol (SIP) invite request of an anonymous roaming LTE emergency phone call that is initiated by the roaming wireless user device 102. The SIP invite message includes an IMEI of the roaming wireless user device 102. Accordingly, the LRF 112 may fetch a MSISDN of the roaming wireless user device 102 that matches the IMEI from the device identifier database of the GMLC 110. The matching MSISDN is eventually forwarded to a PSAP that receives the corresponding LTE emergency phone call.

The Proxy Call Session Control Function (P-CSCF) 114 may route incoming SIP messages of incoming voice calls to an IMS core that further includes the Interrogating CSCF (I-CSCF), a Serving CSCF (S-CSCF), and the Emergency CSCF (E-CSCF) 116. The P-CSCF may handle Internet Protocol Security (IPSec) for communications that are exchanged by the wireless user devices. In some alternative instances, instead of SIP sessions, the P-CSCF 114 may handle Remote Authentication Dial-In User Service (RADIUS) sessions. The I-CSCF is a SIP proxy located at an edge of the IMS core. The IP address of the I-CSCF is published in a Domain Name System (DNS) of the IMS core, such that remote servers may locate and use the I-CSCF as a forwarding point for SIP packets to the IMS core. The S-CSCF may communicate with a telephony application server (TAS) that resides in the core network. The TAS may route voice and/or data communications within the VPLMN 104 and with other networks, including public switch telephone networks (PSTNs).

The E-CSCF 116 is responsible for handling of emergency call service. In operation, the P-CSCF 114 may detect that a SIP message request is for a LTE emergency call and forward the SIP message to the E-CSCF 116. In turn, the E-CSCF 116 may contact the LRF 112 to get a location of the wireless user device that initiated the LTE emergency call, such that the call may be routed to a responsible, e.g., nearest PSAP. The MGCF 118 is equipped with media gateway control functions and protocols to provide SIP support for interworking with the different PSTN/Public Land Mobile Networks (PLMNs). Accordingly, the E-CSCF 116 may use the MGCF 118 to route a LTE emergency call to a PSAP. These components collectively implement the call flow for routing a roaming LTE emergency phone call to a PSAP with a MSISDN of the wireless user device used to make the call. The order in which the steps are described is not intended to be construed as a limitation, and some of the described steps can be performed individually or in combination in any order.

At step 1, the roaming wireless user device 102 may send a connection request for a LTE emergency call to the MME 106 in the core network. In various embodiments, the connection request may be a LTE attach request of an LTE attach procedure or a Public Data Network (PDN) connectivity request of a PDN connectivity procedure to set up one or more Evolved Packet System (EPS) call bearers. The connection request may be initiated to perform connection bearer setup for the device. A connection bearer is a pipeline for transporting data between the roaming wireless user device and the core network of the VPLMN 104. At step 2, the MME 106 may obtain the IMSI, IMEI, and MSISDN of the roaming wireless user device 102. In various embodiments, the MME 106 may send an identity request message to the roaming wireless user device 102. In turn, the roaming wireless user device 102 may send a reply message that includes the IMSI, IMEI, and MSISDN of the device. At step 3, the MME 106 may send a create LTE emergency call session request to the gateway 108, in which the request includes the IMSI, INTEL and MSISDN of the roaming wireless user device 102. The gateway 108 may use the information to create a new entry in an EPS bearer context table and generate a charging identifier. At step 3, the MME 106 may send a service location register (SLR) message to the GMLC 110 that includes the IMSI, IMEI, and MSISDN of the roaming wireless user device 102. At step 5, the MME 106 may receive an acknowledgment message from the GMLC 110 indicating that the GMLC 110 has received the IMSI, IMEI, and MSISDN. In turn, the GMLC 110 may store the IMSI, IMEI, and MSISDN of the roaming wireless user device 102 as associated identifier data for the device in a device identifier database. At step 6, multiple components in the core network may perform additional actions of the LTE attach procedure or the PDN connectivity procedure that sets up one or more connection bearers for the roaming wireless user device 102.

At step 7, the roaming wireless user device 102 may send a SIP register request for the LTE emergency call that includes a user identifier (e.g., a MSISDN, IMEI, etc.) to the P-CSCF 114. At step 8, the P-CSCF 114 may send a SIP registration rejection message to the roaming wireless user device due to the user identifier not belonging to a subscriber of the VPLMN 104. For example, the P-CSCF 114 may validate the user identifier with a subscriber database that is maintained by a Home Subscriber Server (HSS), and the HSS may return an indication that the device is not associated with a known active subscriber.

At step 9, the roaming wireless user device 102 may send an anonymous SIP invite message for the LTE emergency call to the P-CSCF 114. The anonymous SIP invite message is anonymous in the sense that does not contain a user identifier in the form of a MSISDN for the roaming wireless user device 102. However, the anonymous SIP invite message contains an IMEI of the roaming wireless user device 102. At step 10, the P-CSCF 114 may send the anonymous SIP invite message to the E-CSCF 116. At step 11, the E-CSCF 116 may forward the anonymous SIP invite message to the GMLC 110. At step 12, the LRF 112 of the GMLC 110 may use the IMEI that is included in the anonymous SIP invite message to retrieve a matching MSISDN of the roaming wireless user device 102 from the device identifier database maintained by the GMLC 110. Additionally, the LRF 112 may retrieve a PSAP URI of a particular PSAP that corresponds to a geolocation of the roaming wireless user device 102. The particular PSAP may be selected because it is nearest to the geolocation of the roaming wireless user device 102, is a PSAP that services a jurisdiction that encompasses the geolocation of the roaming wireless user device 102 (but not necessarily the nearest), or is otherwise specifically assigned to handle emergency calls from an area that encompasses the geolocation of the roaming wireless user device 102.

At step 13, the GMLC 110 may generate a supplemented SIP invite message that includes the MSISDN of the roaming wireless user device 102 and the PSAP URI of the particular PSAP. Subsequently, the GMLC 110 may send the supplemented SIP invite message to the E-CSCF 116. At step 14, the E-CSCF 116 may route the supplemented SIP invite message to the MGCF 118. In turn, the MGCF may forward the LTE emergency call to the particular PSAP indicated by the PSAP URI, in which the call is identified by the MSISDN of the roaming wireless user device 102. Accordingly, the PSAP may be able to call back the user of the roaming wireless user device 102 using the MSISDN in the event of an unintentional disconnect of the LTE emergency call.

Example Core Network Computing Device Components

Figure 2:
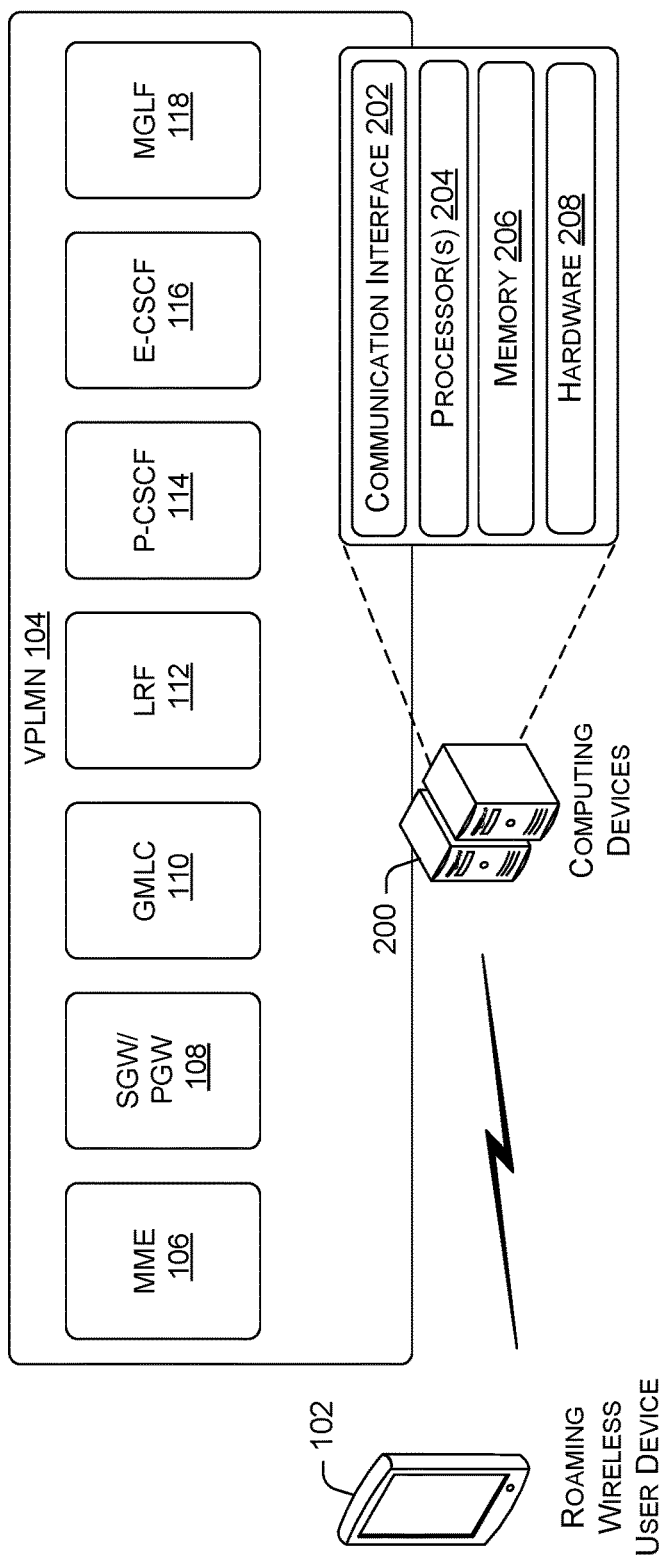
FIG. 2 is a block diagram showing various components of one or more computing devices of a wireless carrier network that supports the routing of a roaming LTE emergency phone call to a PSAP with an associated MSISDN of a wireless user device that placed the call.

FIG. 2 is a block diagram showing various components of one or more computing devices of a wireless carrier network that supports the routing of a roaming LTE emergency phone call to a PSAP with an associated MSISDN of the roaming wireless user device 102 that placed the call. With respect to the architecture shown in FIG. 1, the wireless carrier network may be referred to as the VPLMN 104. The roaming wireless user device 102 may be a feature phone, a smartphone, a tablet computer, a phablet, an embedded computer system, or any other device that uses the wireless communication services that are provided by a wireless carrier network to make LTE voice calls.

The computing devices 200 may include general purpose computers, servers, or other electronic devices that are capable of receive inputs, process the inputs, and generate output data. In other embodiments, the computing devices 200 may be virtual computing devices in the form of virtual machines or software containers that are hosted in a cloud. The computing devices 200 may include a communication interface 202, one or more processors 204, memory 206, and hardware 208. The communication interface 202 may include wireless and/or wired communication components that enable the computing devices 200 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. In various embodiments, the processors 204 and the memory 206 of the computing devices 200 may execute, host, or implement the MME 106, the gateway 108, the GMLC 110, the LRF 112, the P-CSCF 114, the E-CSCF 116, the MGCF 118, as well as other components in the core network of the wireless carrier network.

Example Processes

Figure 3:
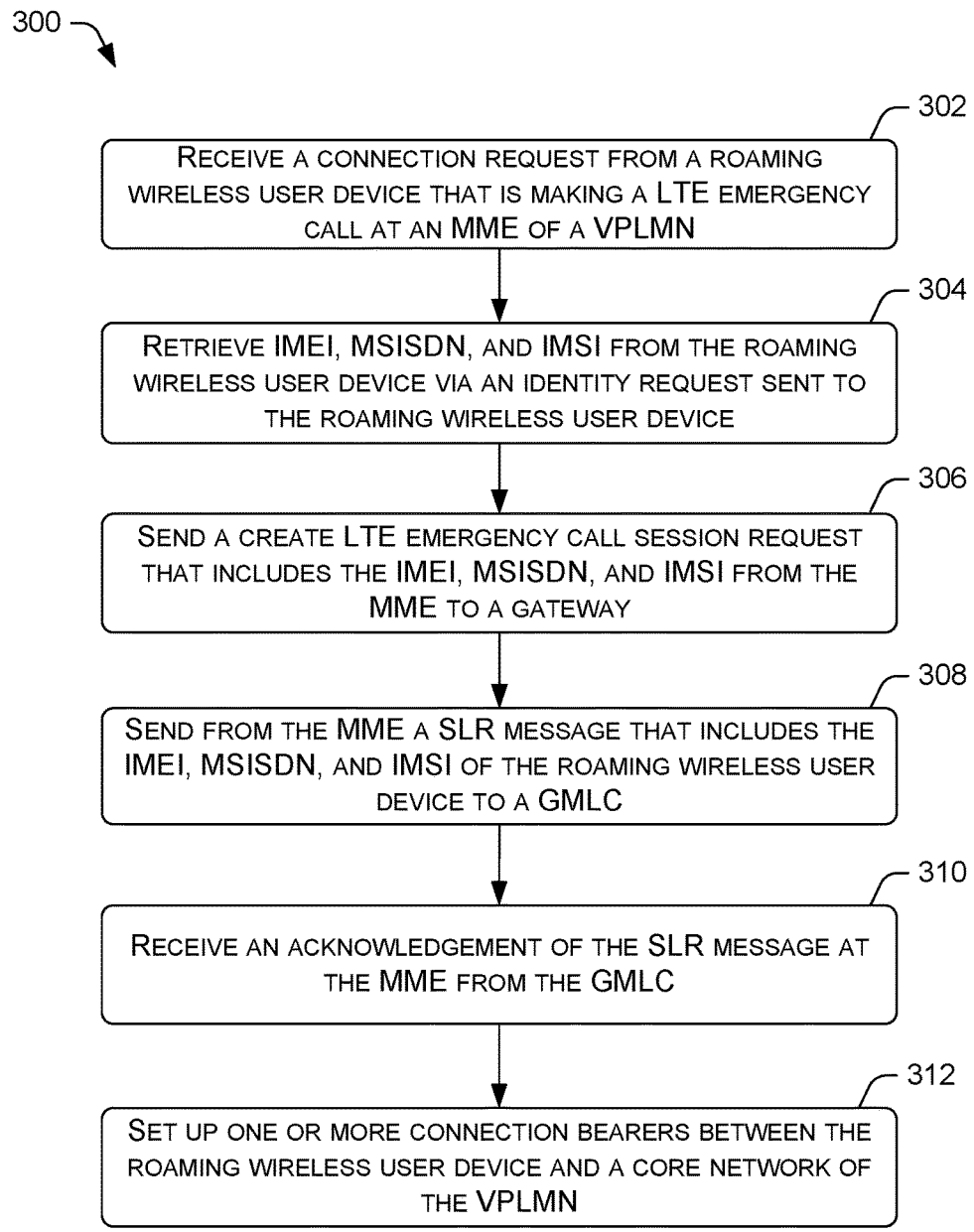
FIG. 3 is a flow diagram of an example process for connecting a roaming wireless user device with a core network of a Visited Public Land Mobile Network (VPLMN) that involves retrieving the International Mobile Equipment Identity (IMEI), the MSISDN, and International Mobile Subscriber Identity (IMSI) of the roaming wireless user device.
Figure 4:
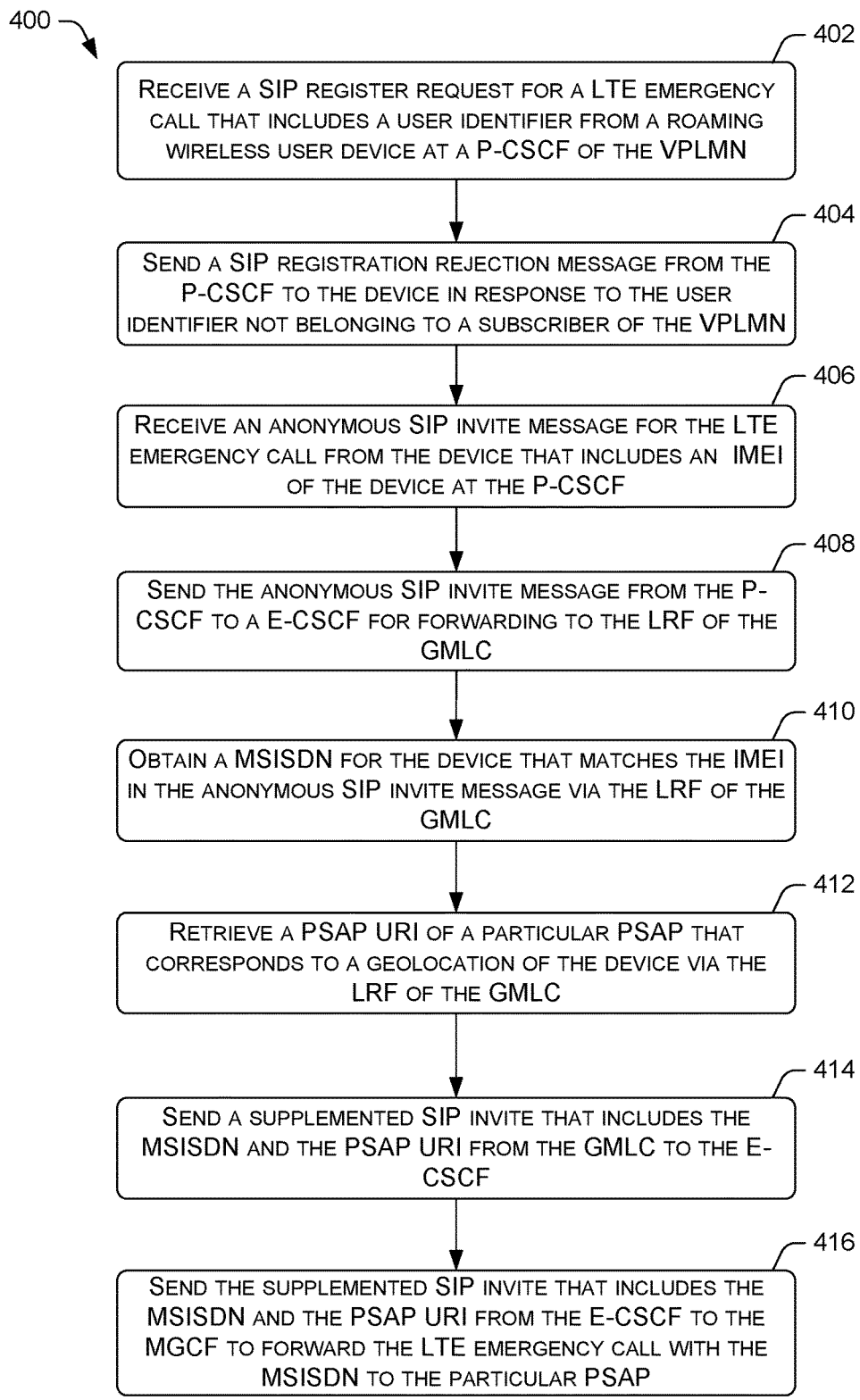
FIG. 4 is a flow diagram of an example process for supporting the routing of a roaming LTE emergency phone call to a PSAP with an associated MSISDN of a wireless user device that placed the call.

FIGS. 3 and 4 present illustrative processes 300 and 400 for routing a roaming LTE emergency phone call to a Public Safety Answering Point (PSAP) with a Mobile Station International Subscriber Directory Number (MSISDN) of the wireless user device used to make the call. Each of the processes 300 and 400 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in mirror to implement the process. For discussion purposes, the processes 300 and 400 are described with reference to the architecture 100 of FIG. 1.

FIG. 3 is a flow diagram of an example process 300 for connecting a roaming wireless user device with a core network of a Visited Public Land Mobile Network (VPLMN) that involves retrieving the International Mobile Equipment Identity (IMEI), the MSISDN, and International Mobile Subscriber Identity (IMSI) of the roaming wireless user device. At block 302, the MME 106 of the VPLMN 104 may receive a connection request from the roaming wireless user device 102 that is making a LTE emergency call. The connection request may be a LTE attach request of a LTE attach procedure or a Public Data Network (PDN) connectivity request of a PDN connectivity procedure to set up one or more Evolved Packet System (EPS) call bearers. At block 304, the MME 106 may obtain the device IMEI, MSISDN, and IMSI from the roaming wireless user device 102 by sending an identity request to the device.

At block 306, the MME 106 may send a create LTE emergency call session request that includes the IMEI, MSISDN, and IMSI to a gateway 108. At block 308, the MME 106 may send a SLR message that includes the IMEI, MSISDN, and IMSI of the roaming wireless user device to a GMLC 110. In turn, the GMLC 110 may store the IMEI, MSISDN, and IMSI in a device identifier database. At block 310, the MME 106 may receive an acknowledgement of the SLR message at the MME from the GMLC 110. At block 312, the MME 106 and other components of the VPLMN 104 may complete a connection of the roaming wireless user device 102 to the core network of the VPLMN 104. The connection is completed by performing additional actions of the LTE attach procedure or the PDN connectivity procedure that sets up one or more connection bearers for the roaming wireless user device 102 that connects the device to the core network.

FIG. 4 is a flow diagram of an example process 400 for supporting the routing of a roaming LTE emergency phone call to a PSAP with an associated MSISDN of a wireless user device that placed the call. At block 402, the P-CSCF 114 of the VPLMN 104 may receive a SIP register request for a LTE emergency call that includes a user identifier from the roaming wireless user device 102. At block 404, the P-CSCF 114 may send a SIP registration rejection message to the roaming wireless user device 102 in response to the user identifier not belonging to a subscriber of the VPLMN 104. At block 406, the P-CSCF 114 may receive an anonymous SIP invite message for the LTE emergency call from the device that includes an IMEI of the roaming wireless user device 102.

At block 408, the P-CSCF 114 may send the anonymous SIP invite message to the E-CSCF 116 for forwarding by the E-CSCF 116 to the LRF 112 of the GMLC 110. At block 410, the LRF 112 of the GMLC 110 may obtain a MSISDN for the roaming wireless user device 102 that matches the IMEI in the anonymous SIP invite message. In various embodiments, the MSISDN of the roaming wireless user device 102 may be retrieved by the LRF 112 from a device identifier database maintained by the GMLC 110. At block 412, the LRF 112 of the GMLC 110 may further retrieve a PSAP URI of a particular PSAP that corresponds to a geolocation of the roaming wireless user device 102. At block 414, the GMLC 110 may send a supplemented SIP invite that includes the MSISDN and the PSAP URI to the E-CSCF 116. At block 416, the E-CSCF 116 may send the supplemented SIP invite that includes the MSISDN and the PSAP URI to the MGCF 118, such that the MGCF 118 may forward the LTE emergency call with the MSISDN of the roaming wireless user device 102 to the particular PSAP.

The techniques provide a PSAP with an ability to call back a user that is using a roaming wireless user device in the event that an emergency phone call initiated at the device is prematurely terminated. Such an ability alleviates the concern that unintended disconnects of anonymous emergency phone calls may potentially jeopardize the life or safety of the caller, and provides an extra margin of safety for wireless device users who are roaming on VPLMNs.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. One or more non-transitory computer-readable media of a Visited Public Land Mobile Network (VPLMN) storing computer-executable instructions that upon execution cause one or more processors to perform acts comprising:

receiving an anonymous Session Initiation Protocol (SIP) invite message at a Proxy Call Session Control Function (P-CSCF) of the VPLMN for a Long-Term Evolution (LTE) emergency call initiated from a wireless user device that is roaming on the VPLMN, the anonymous SIP invite message lacking a Mobile Station International Subscriber Directory Number (MSISDN) of the wireless user device and including an International Mobile Equipment Identity (IMEI) of the wireless user device;

sending the anonymous SIP invite message from the P-CSCF to an Emergency Call Session Control Function (E-CSCF) of the VPLMN for the E-CSCF to forward the anonymous SIP invite message to a Location Retrieval Function (LRF) in a Gateway Mobile Location Centre (GMLC) of the VPLMN;

obtaining a MSISDN of the wireless user device that matches the IMEI in the anonymous SIP invite message via the LRF from a database of the GMLC, the MSISDN being obtained from the wireless user device and stored in the database of the GMLC during an initial connection bearer set up between the wireless user device and a core network of the VPLMN; and sending a supplemented SIP invite message that includes the MSISDN from the GMLC to the E-CSCF for the E-CSCF to route the LTE emergency call with the MSISDN to a particular Public Safety Answering Point (PSAP).

2. The one or more non-transitory computer-readable media of claim 1, wherein the acts further comprise, prior to the receiving of the anonymous SIP invite message at the P-CSCF:

receiving a SIP register request for the LTE emergency call that includes a user identifier from the wireless user device at a P-CSCF; and sending a SIP registration rejection message from the P-CSCF to the wireless user device in response to a determination that the user identifier does not belong to a subscriber of the VPLMN.

3. The one or more non-transitory computer-readable media of claim 2, wherein the user identifier is the MSISDN of the wireless user device.

4. The one or more non-transitory computer-readable media of claim 1, wherein the acts further comprise retrieving a PSAP Uniform Resource Identifier (URI) of the particular PSAP via the LRF of the GMLC, the PSAP URI identifying the particular PSAP as corresponding to a geolocation of the wireless user device, wherein the supplemented SIP invite message as sent by the GMLC further includes the PSAP URI of the particular PSAP.

5. The one or more non-transitory computer-readable media of claim 4, wherein the E-CSCF routes the LTE emergency call by sending the supplemented SIP invite that includes the MSISDN and the PSAP URI to a Media Gateway Control Function (MGCF) that forwards the LTE emergency call with the MSISDN to the particular PSAP.

6. The one or more non-transitory computer-readable media of claim 4, wherein the particular PSAP is a PSAP that is nearest to the geolocation of the wireless user device, services a jurisdiction that encompasses the geolocation of the wireless user device, or is specifically assigned to handle emergency calls from an area that encompasses the geolocation of the wireless user device.

7. The one or more non-transitory computer-readable media of claim 1, wherein the initial connection bearer set up includes acts comprising:

receiving a connection request from the wireless user device that is making a LTE emergency call at a Mobility Management Entity (MME) of the VPLMN, the connection request being one of a LTE attach request or a Public Data Network (PDN) connectivity request to set up an Evolved Packet System (EPS) call bearer;

retrieving at least the IMEI and the MSISDN from the wireless user device via an identity request sent to the wireless user device;

sending a create LTE emergency call session request that includes the IMEI from the MME to a gateway that is a Serving Gateway (SGW) or a Packet Data Network Gateway (PGW);

sending from the MME a service location register (SLR) message that includes at least the IMEI and the MSISDN of the wireless user device to the GMLC, the GMLC storing the IMEI and the MSISDN as associated identifier data for the wireless user device in the database of the GMLC;

receiving an acknowledgment of the SLR message at the MME from the GMLC; and setting up one or more connection bearers between the wireless user device and the core network of the VPLMN.

8. The one or more non-transitory computer-readable media of claim 7, wherein the retrieving includes retrieving an International Mobile Subscriber Identity (IMSI) of the wireless user device along with the IMEI and the MSISDN of the wireless user device via the identity request sent to the wireless user device.

9. The one or more non-transitory computer-readable media of claim 1, wherein the MSISDN is used by particular PSAP to call back the wireless user device in an event the LTE emergency call is unintentionally disconnected.

10. A computer-implemented method, comprising:

receiving an anonymous Session Initiation Protocol (SIP) invite message at a Proxy Call Session Control Function (P-CSCF) of a Visited Public Land Mobile Network (VPLMN) for a Long-Term Evolution (LTE) emergency call initiated from a wireless user device that is roaming on the VPLMN, the anonymous SIP invite message lacking a Mobile Station International Subscriber Directory Number (MSISDN) of the wireless user device and including an International Mobile Equipment Identity (IMEI) of the wireless user device;

sending the anonymous SIP invite message from the P-CSCF to an Emergency Call Session Control Function (E-CSCF) of the VPLMN for the E-CSCF to forward the anonymous SIP invite message to a Location Retrieval Function (LRF) in a Gateway Mobile Location Centre (GMLC) of the VPLMN;

obtaining a MSISDN of the wireless user device that matches the IMEI in the anonymous SIP invite message via the LRF from a database of the GMLC; and sending a supplemented SIP invite message that includes the MSISDN from the GMLC to the E-CSCF for the E-CSCF to route the LTE emergency call with the MSISDN to a particular Public Safety Answering Point (PSAP).

11. The computer-implemented method of claim 10, further comprising:

receiving a SIP register request for the LTE emergency call that includes a user identifier from the wireless user device at a P-CSCF; and sending a SIP registration rejection message from the P-CSCF to the wireless user device in response to a determination that the user identifier does not belong to a subscriber of the VPLMN.

12. The computer-implemented method of claim 10, further comprising retrieving a PSAP Uniform Resource Identifier (URI) of the particular PSAP via the LRF of the GMLC, the PSAP URI identifying the particular PSAP as corresponding to a geolocation of the wireless user device, wherein the supplemented SIP invite message as sent by the GMLC further includes the PSAP URI of the particular PSAP.

13. The computer-implemented method of claim 12, wherein the E-CSCF routes the LTE emergency call by sending the supplemented SIP invite that includes the MSISDN and the PSAP URI to a Media Gateway Control Function (MGCF) that forwards the LTE emergency call with the MSISDN to the particular PSAP, and wherein the particular PSAP is a PSAP that is nearest to the geolocation of the wireless user device, services a jurisdiction that encompasses the geolocation of the wireless user device, or is specifically assigned to handle emergency calls from an area that encompasses the geolocation of the wireless user device.

14. The computer-implemented method of claim 10, wherein the MSISDN is obtained from the wireless user device and stored in the database of the GMLC during an initial connection bearer set up between the wireless user device and a core network of the VPLMN, the initial connection bearer set up includes acts comprising:

receiving a connection request from the wireless user device that is making a LTE emergency call at a Mobility Management Entity (MME) of the VPLMN, the connection request being one of a LTE attach request or a Public Data Network (PDN) connectivity request to set up an Evolved Packet System (EPS) call bearer;

retrieving at least the IMEI and the MSISDN from the wireless user device via an identity request sent to the wireless user device;

sending a create LTE emergency call session request that includes the IMEI from the MME to a gateway that is a Serving Gateway (SGW) or a Packet Data Network Gateway (PGW);

sending from the MME a service location register (SLR) message that includes at least the IMEI and the MSISDN of the wireless user device to the GMLC, the GMLC storing the IMEI and the MSISDN as associated identifier data for the wireless user device in the database of the GMLC;

receiving an acknowledgment of the SLR message at the MME from the GMLC; and setting up one or more connection bearers between the wireless user device and the core network of the VPLMN.

15. The computer-implemented method of claim 14, wherein the retrieving includes retrieving an International Mobile Subscriber Identity (IMSI) of the wireless user device along with the IMEI and the MSISDN of the wireless user device via the identity request sent to the wireless user device.

16. The computer-implemented method of claim 10, wherein the MSISDN is used by particular PSAP to call back the wireless user device in an event the LTE emergency call is unintentionally disconnected.

17. One or more computing devices on a Visited Public Land Mobile Network (VPLMN), comprising:

one or more processors; and memory having instructions stored therein, the instructions, when executed by the one or more processors, cause the one or more processors to perform acts comprising:

receiving an anonymous Session Initiation Protocol (SIP) invite message at a Proxy Call Session Control Function (P-CSCF) of the VPLMN for a Long-Term Evolution (LTE) emergency call initiated from a wireless user device that is roaming on the VPLMN, the anonymous SIP invite message lacking a Mobile Station International Subscriber Directory Number (MSISDN) of the wireless user device and including an International Mobile Equipment Identity (IMEI) of the wireless user device;

sending the anonymous SIP invite message from the P-CSCF to an Emergency Call Session Control Function (E-CSCF) of the VPLMN for the E-CSCF to forward the anonymous SIP invite message to a Location Retrieval Function (LRF) in a Gateway Mobile Location Centre (GMLC) of the VPLMN;

obtaining a MSISDN of the wireless user device that matches the IMEI in the anonymous SIP invite message via the LRF from a database of the GMLC;

retrieving a PSAP Uniform Resource Identifier (URI) of a particular Public Safety Answering Point (PSAP) via the LRF of the GMLC; and sending a supplemented SIP invite message that includes the MSISDN and the PSAP URI from the GMLC to the E-CSCF for the E-CSCF to route the LTE emergency call with the MSISDN to the particular PSAP.

18. The one or more computing devices of claim 17, wherein the acts further comprise, prior to the receiving of the anonymous SIP invite message at the P-CSCF:

receiving a SIP register request for the LTE emergency call that includes a user identifier from the wireless user device at a P-CSCF; and sending a SIP registration rejection message from the P-CSCF to the wireless user device in response to a determination that the user identifier does not belong to a subscriber of the VPLMN.

19. The one or more computing devices of claim 18, wherein the MSISDN is obtained from the wireless user device and stored in the database of the GMLC during initial connection bearer set up between the wireless user device and a core network of the VPLMN, the PSAP URI identifies the particular PSAP as corresponding to a geolocation of the wireless user device, and wherein the user identifier is the MSISDN of the wireless user device.

20. The one or more computing devices of claim 19, wherein the initial connection bearer set up includes acts comprising:

receiving a connection request from the wireless user device that is making a LTE emergency call at a Mobility Management Entity (MME) of the VPLMN, the connection request being one of a LTE attach request or a Public Data Network (PDN) connectivity request to set up an Evolved Packet System (EPS) call bearer;

retrieving at least the IMEI and the MSISDN from the wireless user device via an identity request sent to the wireless user device;

sending a create LTE emergency call session request that includes the IMEI from the MME to a gateway that is a Serving Gateway (SGW) or a Packet Data Network Gateway (PGW);

sending from the MME a service location register (SLR) message that includes at least the IMEI and the MSISDN of the wireless user device to the GMLC, the GMLC storing the IMEI and the MSISDN as associated identifier data for the wireless user device in the database of the GMLC;

receiving an acknowledgment of the SLR message at the MME from the GMLC; and setting up one or more connection bearers between the wireless user device and the core network of the VPLMN.

* * * * *